Patented Oct. 1, 1935

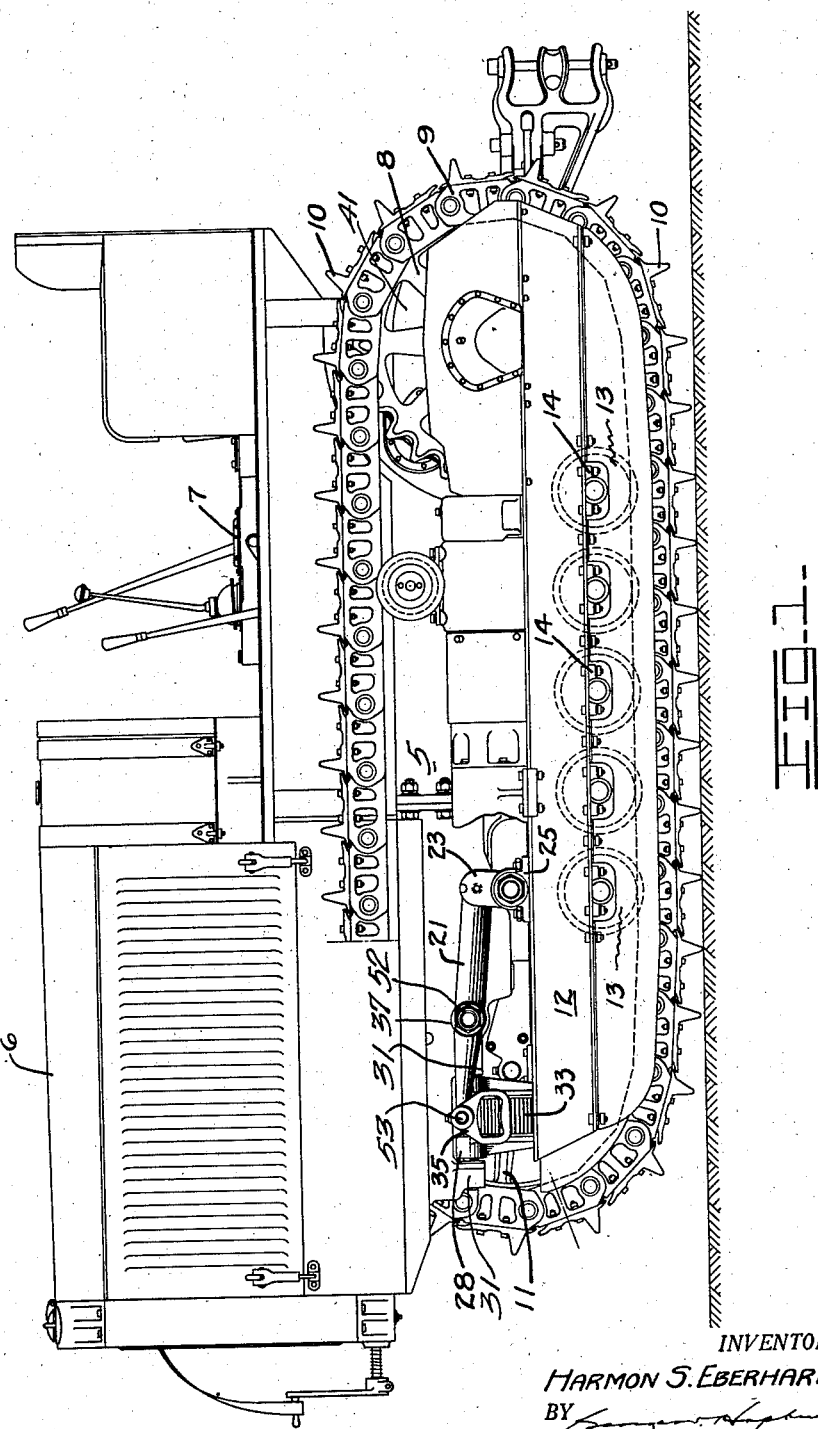

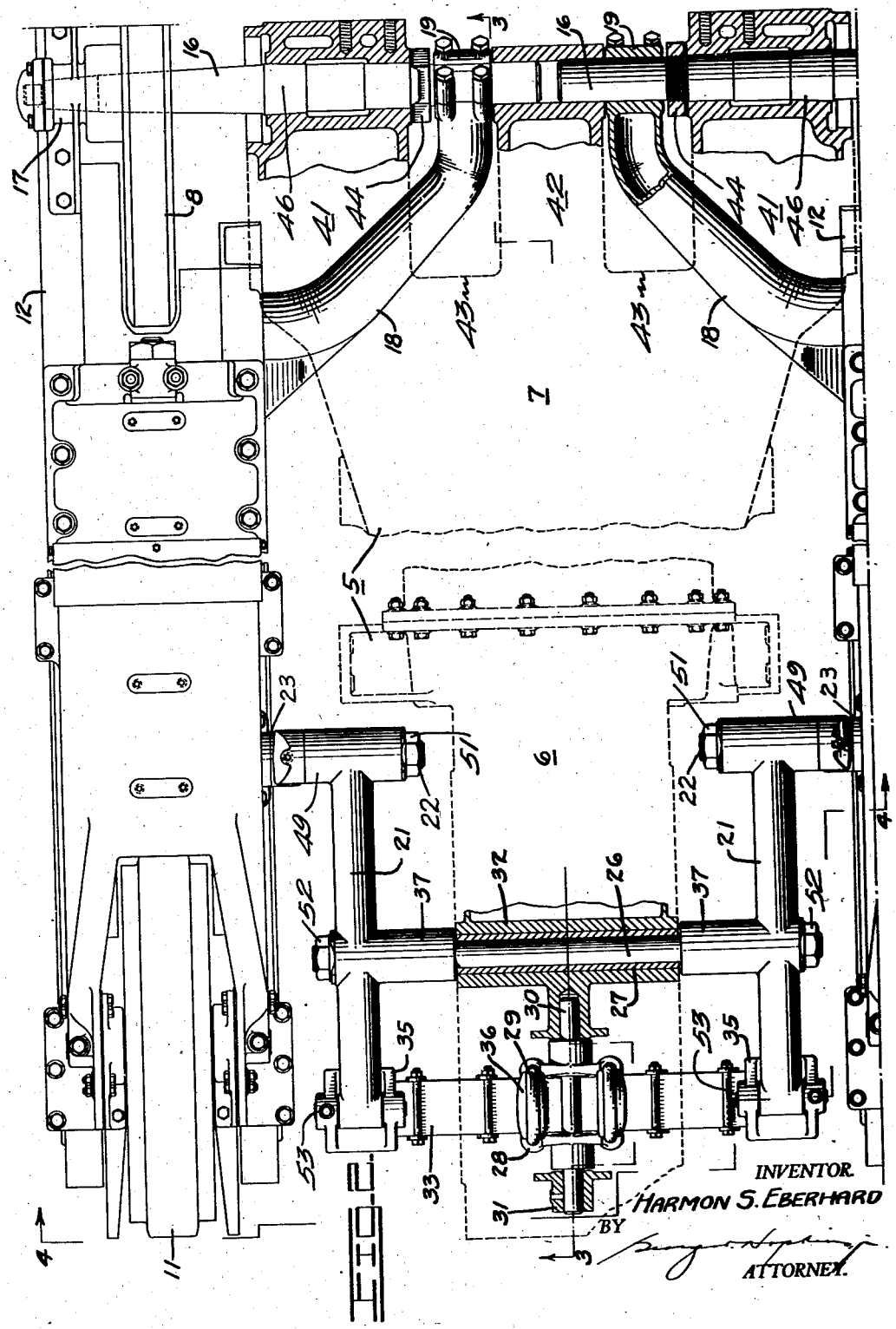

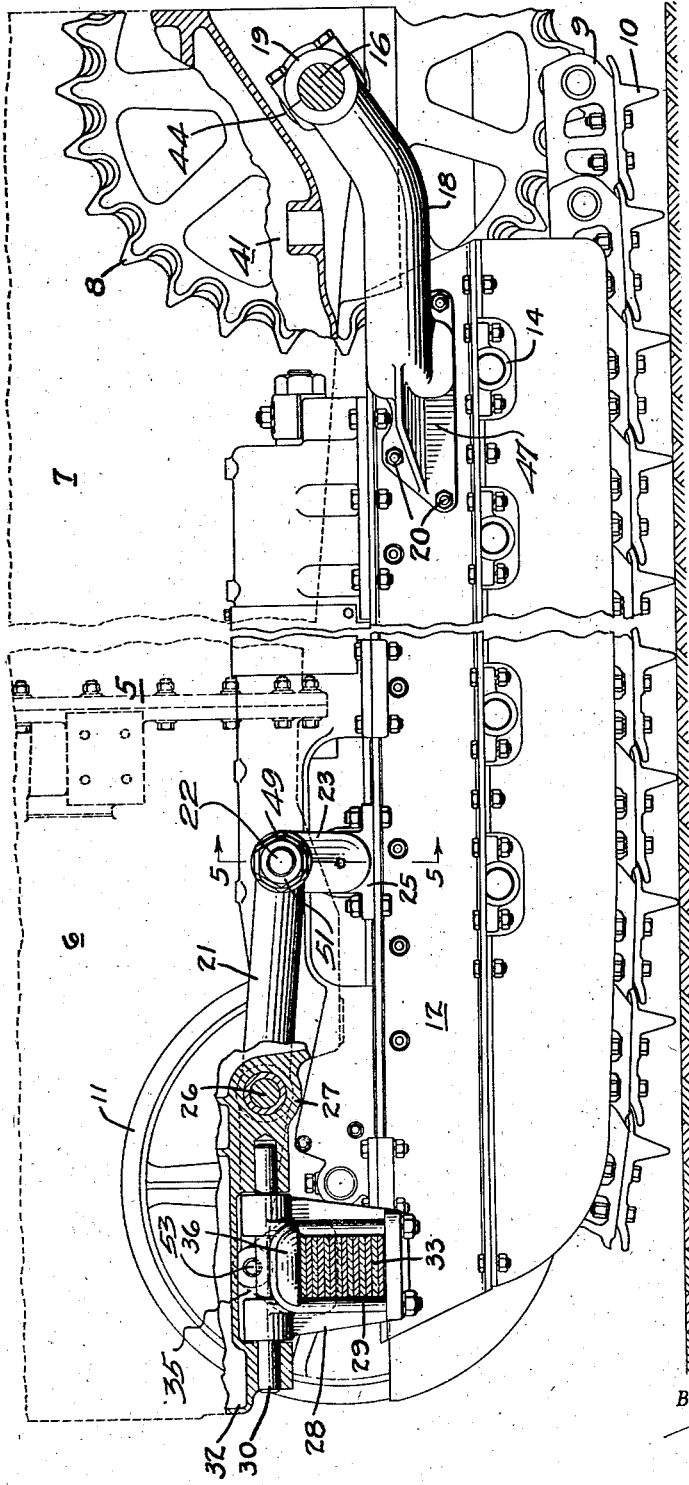

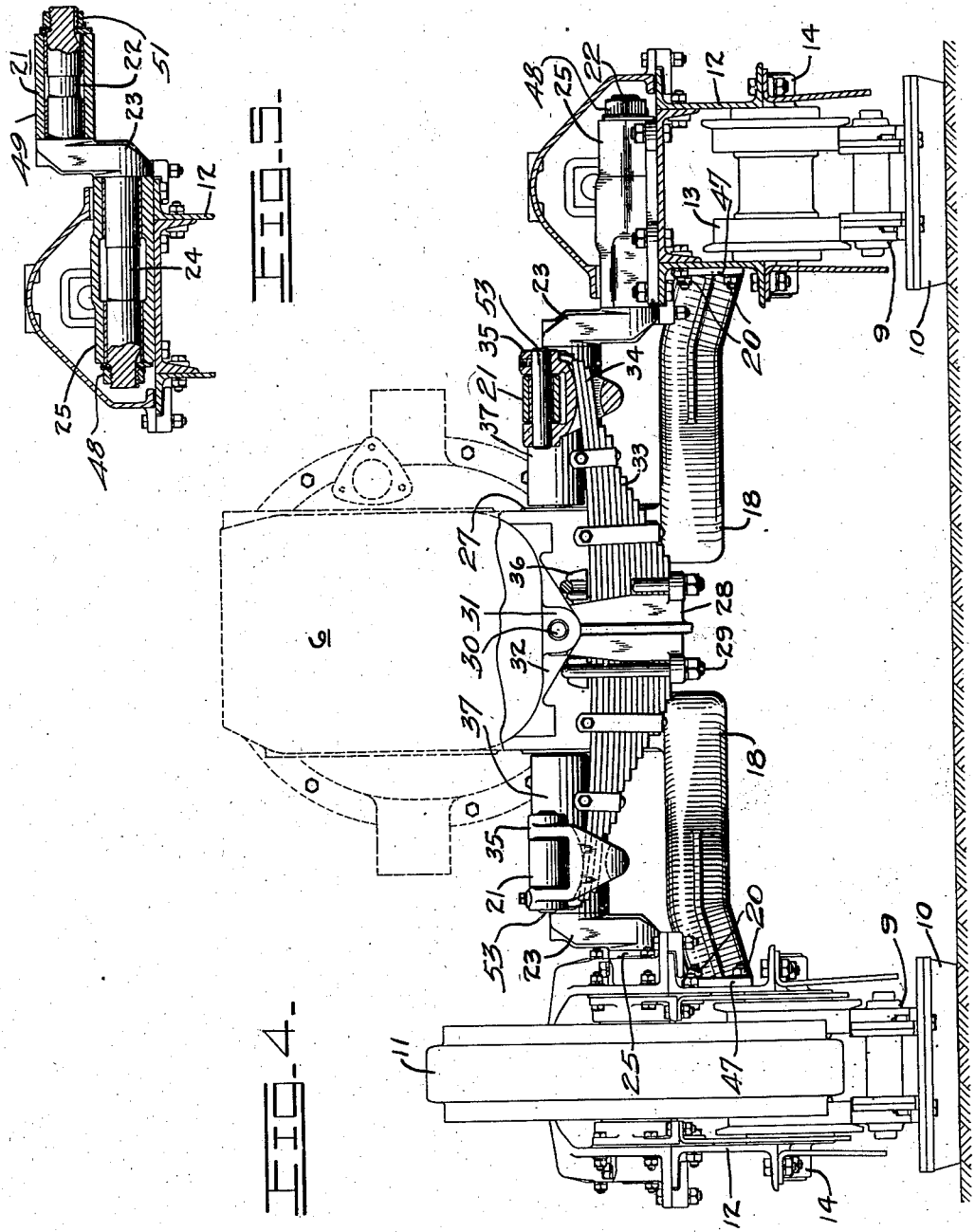

2,015,886

UNITED STATES PATENT OFFICE 2,015,886

TRACTOR

Harmon S. Eberhard, San Leandro, Calif., assignor to Caterpillar Tractor Co., San Leandro, Calif., a corporation of California Application January 18, 1932, Serial No. 587,258

23 Claims. (Cl. 305—9)

This invention is concerned with the construction of a tractor and particularly one of the track type. Such tractors are generally characterized by the inclusion of a main frame conveniently formed by the power plant of the tractor, and a pair of truck frames carrying tracks upon opposite sides of the main frame. It has been found desirable to fabricate the tractor in such a manner that each truck frame is constrained to movement in a plane parallel to a vertical plane containing the longitudinal axis of the main frame. In other words, it is desired that the truck frames be permitted to oscillate with respect to the main frame, but that all lateral movement of a truck frame with respect to the main frame be substantially prohibited. If the truck frame moves at all laterally, particularly the front end of the truck frame, it places a great stress upon the rear hinge connection between the truck frame and the main frame. The present invention is particularly advantageous where the truck frame is hinged concentrically with a drive sprocket.

It is in general the object of the present invention to provide a tractor construction in which the movement of the truck frames with respect to the main frame is limited to oscillatory movement, all lateral movement being substantially prohibited.

Another object of the invention is to provide for the connection of the main frame of a tractor and the truck frames to permit equalization of the movement of the truck frames with respect to the main frame, while positively restraining the truck frames against lateral movement relative to the main frame.

The invention possesses numerous other objects and features of advantage, some of which, with the foregoing, will appear at length in the following wherein I will disclose a preferred form of my invention:

Description of drawings

In the drawings, Fig. 1 is a side elevation of a tractor embodying the construction of my invention.

Fig. 2 is a plan view illustrating connection of the main frame to the truck frames and equalizer bar, parts being shown in section.

Fig. 3 is a section taken along the line 3—3 of Fig. 2.

Fig. 4 is a section along the line 4—4 of Fig. 2.

Fig. 5 is a section taken along the line 5—5 of Fig. 3.

Description of preferred mechanism

In the form of tractor shown, I have depicted a machine in which the power units of the tractor are assembled as one physical body. Thus, engine 6 (Figs. 1 and 2) and transmission unit 7 are so fabricated that they constitute a unitary power plant which is used as main frame 5 of the tractor.

Power initially derived from engine 6 and transmitted through transmission unit 7, is supplied (Figs. 1 and 3) to drive sprockets 8, arranged upon opposite sides of the tractor. Drive sprockets 8 (Figs. 1, 3, and 4) are in engagement with chains 9 which carry track shoes 10 assembled to provide ground-engaging tracks. Chains 9 (Figs. 1 and 3) are carried over idler wheel 11 positioned at the forward end of truck frames 12. Sprockets 8 and wheels 11 are respectively positioned at opposite ends of each truck frame 12 so that several track shoes 10 engage the surface of the ground at one time. Ground-engaging portions of chains 9 (Figs. 1, 3, and 4) are engaged with track rollers 13 (Figs. 1 and 4) which serve to support the weight of the tractor on chains 9. Rollers 13 are positioned in bearings 14 upon truck frames 12.

Means are provided on main frame 5 to secure truck frames 12 for oscillatory movement with respect to main frame 5 and to prohibit all other movement with respect to main frame 5. Each truck frame 12 is hinged by bracket 17 on stub axle 16 in main frame 5. Sprockets 8 revolve about the axis of axles 16, truck frames 12 thus being hinged coaxially with sprockets 8 (Figs. 2 and 3). The outboard side of truck frames 12 (Fig. 2) extends rearwardly to receive bracket 17, while the inboard side is cut off to permit each truck frame to hinge on stub axle 16.

Transmission case 7 (Fig. 2) includes housings 41 which enclose the usual steering clutches for the tractor, while housing portion 42 contains the usual bevel gear drive of the tractor. Housing portion 42 is spaced from housing 41 to provide apertures 43.

Tapered stub axles 16 extend through and are secured in housings 41 (Fig. 2) by nuts 44 which engage a threaded portion on each axle to draw tapered axle portions 46 into engagement with housings 41. Stub axles 16 extend through apertures 43 and into housing portion 42. Tubular arms 18 are fastened by bearings 19 on that portion of stub axles 16 in apertures 43 (Figs. 2 and 3). Arms 18 extend forwardly and terminate in bracket 47 which is fastened upon the inboard side of truck frames 12 by bolts 20 (Figs. 3 and 4). Truck frames 12 are thus positioned for hinging about axles 16. Arms 18 prevent motion other than that of merely hinging upon axle 16, and lateral stresses set up at this end of the tractor are transmitted and distributed to main frame 5 at points which can be made amply strong.

The other ends of truck frames 12 are connected to main frame 5 in such a manner that, while truck frames 12 are free to oscillate about axle 16, lateral movement is prohibited. Crankshafts 24

(Fig. 5) are fastened in bearings 25 upon the truck frames 12. Nut 48 prevents sliding movement of each crankshaft 24 in each bearing 25. Crank arm 23 normally extends vertically from crankshaft 24. Crank pin 22, on crank arm 23, is journalled in end 49 of link member 21. Crank pin 22 is prevented from sliding in link end 49 by nut 51. Link members 21 are journalled by bearings 37 on shaft 26 which extends through bearing 27 on crankcase 32 of engine 6. Nuts 52 prevent sliding movement of link members 21 on shaft 26. Link members 21 extend forwardly and carry brackets 35 which are hinged by pins 53 on link members 21.

To transmit motion of one link member 21 to the other link member so as to equalize movement of one truck frame 12 relative to the other truck frame 12 and main frame 5, inverted spring 33 is extended between brackets 35 with spring ends 34 in brackets 35. (Figs. 2 and 4). Spring 33 is suspended in and fastened to bracket 28 by U-bolts 29 passed about spring 33 and over pads 36. Bracket 28 is hinged on pin 30 which is carried in lugs 31 on crankcase 32. Spring 33 thus serves as a link which together with link members 21 support the front end of the main frame on the truck frames. Also, by using spring 33 between link members 21, movement of a truck frame is cushioned. However, a solid bar can be used in place of spring 33 to connect link members 21 and serve as an equalizer bar or link.

Oscillation of one truck frame 12 is thus transmitted to the other truck frame 12 so that main frame 5 only moves through half the distance that an oscillating truck frame moves. At the same time, any lateral displacement of a truck frame 12 is prohibited. Truck frames 12 are maintained longitudinally parallel to each other and parallel to the longitudinal axis of main frame 5 and their own longitudinal axes. Relative movement between truck frames 12 and main frame 5 is confined to movement in only three spaced and parallel planes, each plane containing only the longitudinal axis of one of truck frames 12 or main frame 5.

Since link members 21 are of fixed length and rotate about the axis of shaft 26 and since truck frames 12 rotate about axis of axles 16, link members 21 and truck frames 12 follow different oscillatory paths, generally non-coincident, about their different axes of rotation. Crankshaft 24, crank arms 23, and crank pins 22 provide a connection which enables link members 21 and truck frames 12 to follow their non-coincident oscillatory paths, at the same time prohibiting lateral displacement between a track frame 12 and main frame 5.

I, therefore, claim as my invention:

1. In a tractor, a main frame, a pair of truck frames on opposite sides of said main frame and hingedly connected thereto, means for connecting said truck frames to said main frame to permit only oscillatory movement of said main frame relative to said truck frames, and an equalizer bar mounted on said main frame and slidably engaging said connecting means.

2. In a tractor, a main frame, a pair of truck frames, load supporting connections between the rear end of said main frame and said truck frames, and load supporting connections between the front end of said main frame and said truck frames; said latter load supporting connections comprising cooperating links connected together and mounted on the front end of said main frame on substantially horizontal pivots having axes substantially normal to each other.

3. In a tractor, a main frame, a pair of truck frames, load supporting connections between the rear end of said main frame and said truck frames, and load supporting connections between the front end of said main frame and said truck frames; said latter load supporting connections comprising a lever at each side of said main frame movably connected to a truck frame and to said main frame, an equalizer bar positioned adjacent the front end of said main frame and connected with said levers, and means for pivotally connecting said equalizer bar to said main frame for movement about a substantially horizontal axis.

4. In a tractor, a main frame, a pair of truck frames, load supporting connections between the rear end of said main frame and said truck frames, and load supporting connections between the front end of said main frame and said truck frames; said latter load supporting connections comprising substantially straight levers one at each side of said main frame and adjacent the front end thereof, means for movably connecting an end of each lever to a truck frame, means for pivotally connecting each lever intermediate its ends to said main frame, an equalizer bar positioned adjacent the front of said main frame, and means connecting each end of said equalizer bar to a lever.

5. In a tractor, a main frame, a pair of truck frames, load supporting connections between the rear end of said main frame and said truck frames, and load supporting connections between the front end of said main frame and said truck frames; said latter load supporting connections comprising substantially straight levers one at each side of said main frame and adjacent the front end thereof, means for movably connecting an end of each lever to a truck frame, means for pivotally connecting each lever intermediate its ends to said main frame, an equalizer bar positioned under and adjacent the front of said main frame, said equalizer bar extending transversely of said main frame and being connected to said levers at the ends thereof opposite to the ends connected to said truck frames, and means for pivotally connecting said equalizer bar to the main frame for movement about a substantially horizontal axis.

6. In a tractor, a main frame, a pair of spaced truck frames each movably connected to said main frame and between which said main frame is positioned, means including a link member connected to each truck frame and to said main frame for preventing lateral movement of said truck frames with respect to said main frame, and an inverted equalizer spring connected to said main frame and to said link members.

7. In a tractor, a main frame, a pair of spaced truck frames each movably connected to said main frame and between which said main frame is positioned, means including a link member connected adjacent one end thereof to each truck frame for preventing lateral movement of said truck frames with respect to said main frame, each of said link members being pivoted on said main frame intermediate its ends whereby movement of the opposite end of each link member is always in a direction opposite to that of the truck frame to which the link member is connected, and an inverted equalizer spring connected to said main frame and having its ends connected with said link members.

8. In a tractor, a main frame, a pair of spaced truck frames each movably connected to said main frame and between which said main frame is positioned, means including a link member connected adjacent one end thereof to each truck frame for preventing lateral movement of said truck frames with respect to said main frame, each of said link members being pivoted on said main frame intermediate its ends whereby movement of the opposite end of each link member is always in a direction opposite to that of the truck frame to which the link member is connected, an inverted equalizer spring positioned under said main frame and having its ends connected with said link members, and means for pivotally connecting said spring to said main frame for movement about a substantially horizontal axis.

9. In a tractor, a main frame, a truck frame at each side of said main frame and movably connected thereto, a member connected to each truck frame and to said main frame to prevent lateral movement of each truck frame with respect to said main frame, each of said members being movable by relative movement between said truck frames and said main frame, and an equalizer member connected to said main frame and having its ends connected with said members.

10. In a tractor, a main frame, a pair of truck frames, each hingedly connected to said main frame adjacent one end thereof, said hinge connection including two widely spaced bearings, one of which is positioned adjacent the longitudinal center line of said main frame to cooperate with another of said bearings for resisting lateral displacement of said truck frame with respect to said main frame, means including a link member pivotally connected to both said main frame and each truck frame adjacent the opposite end thereof to positively preclude said lateral displacement, and an equalizer bar pivotally connected to said main frame underneath thereof and having its ends connected to said means, for equalizing the hinge movements of said truck frames.

11. In a tractor, a main frame, spaced truck frames, means for supporting an end of said main frame on said truck frames, and means for supporting an opposite end of said main frame on said truck frames, said latter means including an equalizer member attached to said main frame intermediate its ends and lever members connected to said main frame, said lever members exerting downward pressure on said equalizer member.

12. In a tractor, a main frame, spaced truck frames, means for supporting an end of said main frame on said truck frames, means for supporting an opposite end of said main frame on said truck frames, said latter means including a spring attached to said main frame intermediate its ends and adapted to resist downward pressure at its ends, and members connected to said main frame and exerting downward pressure on the ends of said spring.

13. In a tractor, a main frame, spaced truck frames, means for supporting an end of said main frame on said truck frames, and means for supporting an opposite end of said main frame on said truck frames, said latter means including a lever member attached to said main frame intermediate its ends, and link members connected to said main frame and pressing downwardly on the ends of said lever member.

14. In a tractor, a main frame, spaced truck frames, means for supporting an end of said main frame on said truck frames, and means for supporting an opposite end of said main frame on said truck frames, said latter means including a lever member attached to said main frame intermediate its ends, link members connected to said main frame and exerting downward pressure on the ends of said lever member, and means connecting said link members to said truck frames.

15. In a tractor, a main frame, spaced truck frames, means for supporting an end of said main frame on said truck frames, and means for supporting an opposite end of said main frame on said truck frames, said latter means including a lever member pivotally attached to said main frame intermediate its ends, link members pivotally attached to said main frame and exerting downward pressure on the ends of said lever member, and means connecting said link members to said truck frames.

16. In a tractor, a main frame, spaced truck frames, means for supporting an end of said main frame on said truck frames, and means for supporting an opposite end of said main frame on said truck frames, said latter means including a spring hanger, a spring mounted in said hanger, means for pivotally connecting said hanger to said main frame at a position above said spring, and link members connected to said main frame and pressing downwardly on the ends of said spring.

17. In a tractor, a main frame, a pair of truck frames, each truck frame being at a side of said main frame, load supporting connections between the rear end of said main frame and said truck frames, a pair of rigid link members, each link member being adjacent a side of said main frame, means journaling each link member upon said main frame at a point intermediate the ends of said link member so that said link member has a front portion and a rear portion, means connecting the rear portion of each link member to a truck frame for movement relative to said truck frame, and an equalizer member connected to said main frame adjacent the front thereof and extending transversely with respect to the longitudinal axis of said main frame and to said link members, the ends of said equalizer member terminating adjacent the front portions of said link members and being connected to the front portions of said link members.

18. In a tractor, a main frame, a pair of truck frames, each truck frame being at a side of said main frame, load supporting connections between the rear end of said main frame and said truck frames, a pair of rigid link members, each link member being adjacent a side of said main frame, means journaling each link member upon said main frame at a point intermediate the ends of said link member so that said link member has a front portion and a rear portion, means connecting the rear portion of each link member to a truck frame for movement relative to said truck frame, and an equalizer member underneath said main frame adjacent the front thereof and extending transversely with respect to the longitudinal axis of said main frame and to said link members, said equalizer member being connected to said main frame intermediate its ends for movement about a horizontal axis extending longitudinally of said main frame, the ends of said equalizer member being connected to the front portions of said link members so that downward pressure is exerted on the ends of said equalizer member by said front portions of said link members.

19. In a tractor; a main frame; a pair of truck frames, each truck frame being at a side of said main frame; load supporting connections between the rear end of said main frame and said truck frames; an equalizer member connected to said main frame adjacent the front thereof; and link means adjacent each side of said main frame providing a connection between said main frame, the truck frame at the side of said main frame and an end of said equalizer member; each of said link means consisting essentially of a single rigid member having one point of connection directly to said main frame, another point of connection to said truck frame and a third point of connection directly to an end of said equalizer member.

20. In a tractor, a main frame, a pair of truck frames, each truck frame being at a side of said main frame and hinged thereto, a pair of link members, each link member being journaled on said main frame at an intermediate point in its length, an equalizer bar connected to said main frame and to an end portion of each of said link members, and a pair of cranks, each crank being journaled on a truck frame and each of said link members being journaled on a crank.

21. In a tractor, a main frame, spaced truck frames, means hingedly supporting an end of said main frame on said truck frames, and means supporting the opposite end of said main frame on said truck frames, said latter means including a lever member attached to said main frame intermediate its ends, and link members connected to said main frame, to the truck frames and to the ends of said lever member, the connections of said link members to the ends of said lever member causing the link members to exert a downward pressure on the ends of said lever member.

22. In a tractor, a main frame, spaced truck frames, means hingedly supporting an end of said main frame on said truck frames, and means supporting the opposite end of said main frame on said truck frame, said latter means including an equalizer bar extending transversely with respect to the main frame and movably attached to the main frame intermediate its ends, and link members each connected to said main frame intermediate its ends and at one end to a truck frame, the other end of each link member being connected to an end of said equalizer bar, the connections of said link members to the ends of said equalizer bar causing the link members to exert a downward thrust on the ends of said equalizer bar.

23. In a tractor, a main frame, a track frame on one side of the main frame, a second track frame on the other side of said main frame, a hinge connection between said main frame and each of said track frames, an equalizer member connected to said main frame for movement about a horizontal axis and positioned forwardly of said main frame, a lever member movably mounted on said main frame at each side thereof and connected to said equalizer member, and means connecting the lever members to said track frames.

HARMON S. EBERHARD.